US010098054B2

(12) United States Patent
Lee et al.

(10) Patent No.: US 10,098,054 B2
(45) Date of Patent: Oct. 9, 2018

(54) METHOD AND APPARATUS FOR DISCOVERY OF SECTOR IN WIRELESS LOCAL AREA NETWORK SYSTEM

(71) Applicant: Electronics and Telecommunications Research Institute, Daejeon (KR)

(72) Inventors: Jae Seung Lee, Daejeon (KR); Min Ho Cheong, Daejeon (KR); Hyoung Jin Kwon, Daejeon (KR); Jae Woo Park, Daejeon (KR); Sok Kyu Lee, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 0 days.

(21) Appl. No.: 14/431,741

(22) PCT Filed: Sep. 30, 2013

(86) PCT No.: PCT/KR2013/008734
§ 371 (c)(1),
(2) Date: Mar. 26, 2015

(87) PCT Pub. No.: WO2014/051405
PCT Pub. Date: Apr. 3, 2014

(65) Prior Publication Data
US 2015/0245377 A1    Aug. 27, 2015

(30) Foreign Application Priority Data

Sep. 28, 2012 (KR) .................. 10-2012-0108862
Sep. 30, 2013 (KR) .................. 10-2013-0116070

(51) Int. Cl.
*H04W 72/04* (2009.01)
*H04W 16/28* (2009.01)
(Continued)

(52) U.S. Cl.
CPC ........ *H04W 40/244* (2013.01); *H04W 48/12* (2013.01); *H04W 72/044* (2013.01); *H04W 16/28* (2013.01); *H04W 84/12* (2013.01)

(58) Field of Classification Search
CPC ........... H04W 72/1278; H04W 72/082; H04W 40/244; H04W 84/12; H04W 48/12;
(Continued)

(56) References Cited
U.S. PATENT DOCUMENTS 6,349,217 B1 * 2/2002 Honcharenko ....... H04W 16/28
455/452.1
2006/0089141 A1 * 4/2006 Ho ...................... H04W 48/12
455/436
(Continued)

FOREIGN PATENT DOCUMENTS

KR    10-2010-0074332 A    7/2010
KR    10-2010-0127777 A    12/2010
(Continued)

OTHER PUBLICATIONS

Abhijit Sarma et al., "A Zone Based Interleaved Scanning Technique for Fast Handoff in IEEE 802.11 Wireless Networks", 2009 10th International Symposium on Pervasive Systems, Algorithms, and Networks, 2009, pp. 232-237, IEEE Computer Society.
(Continued)

*Primary Examiner* — Edan Orgad
*Assistant Examiner* — Ivan O Latorre

(57) ABSTRACT

Provided is a sector discovery apparatus and method, the method including setting, by an AP in a WLAN system, an omni-beacon interval for transmitting an omnidirectional beacon and sector beacon intervals for transmitting a sector beacon with respect to one of a plurality of sectors which are spatially divided, transmitting the sector beacon to a current sector among the plurality of sectors, transmitting, to the
(Continued)

current sector, a transmission frame indicating sectorized transmission or a transmission frame indicating omnidirectional transmission, in a sector interval between the sector beacon intervals, and receiving, from a terminal located in the current sector, a response frame indicating an association performed by receiving the transmission frame indicating the sectorized transmission.

7 Claims, 6 Drawing Sheets

(51) Int. Cl.
*H04W 40/24* (2009.01)
*H04W 48/12* (2009.01)
*H04W 84/12* (2009.01)

(58) Field of Classification Search
CPC ..... H04W 74/04; H04W 48/16; H04W 74/08; H04W 4/08; H04W 8/186; H04W 8/26; H04W 16/28; H04W 8/005; H04W 72/046; H04W 16/24; H04W 74/02; H04W 74/006; H04W 72/044; H01Q 3/26; H04B 7/0682; H04B 7/0491–7/0495; H04L 67/16; H04L 5/0053
USPC ....... 370/329, 330, 328, 310, 312, 338, 336, 370/350, 311, 315, 254; 375/130; 455/456.1, 452.1, 446, 500
See application file for complete search history.

(56) References Cited

U.S. PATENT DOCUMENTS

| | | | |
|---|---|---|---|
| 2006/0159041 A1 | 7/2006 | Zhun | |
| 2006/0164969 A1* | 7/2006 | Malik | H04B 7/0408 370/203 |
| 2007/0297365 A1* | 12/2007 | Li | H04W 4/12 370/331 |
| 2008/0242307 A1* | 10/2008 | Ho | H04W 48/12 455/446 |
| 2009/0225730 A1 | 9/2009 | Kesselman et al. | |
| 2009/0232023 A1* | 9/2009 | Soffer | H01Q 3/26 370/254 |
| 2009/0232035 A1* | 9/2009 | Cordeiro | H01Q 3/26 370/310 |
| 2009/0232106 A1 | 9/2009 | Cordeiro et al. | |
| 2009/0233549 A1* | 9/2009 | Maltsev | H01Q 3/26 455/41.2 |
| 2009/0273520 A1* | 11/2009 | Shao | H04W 16/28 342/417 |
| 2010/0046439 A1* | 2/2010 | Chen | H04W 48/08 370/329 |
| 2010/0056062 A1* | 3/2010 | Zhang | H04B 7/0617 455/63.1 |
| 2010/0103045 A1* | 4/2010 | Liu | H04B 7/0617 342/372 |
| 2010/0157955 A1* | 6/2010 | Liu | H04W 72/0446 370/336 |
| 2010/0214169 A1* | 8/2010 | Kafle | H01Q 3/26 342/368 |
| 2010/0265924 A1* | 10/2010 | Yong | H04B 7/0695 370/336 |
| 2011/0149842 A1* | 6/2011 | Cordeiro | H04B 7/0491 370/328 |
| 2011/0170573 A1* | 7/2011 | Kim | H04W 48/08 375/130 |
| 2011/0205969 A1* | 8/2011 | Ahmad | H04W 16/28 370/328 |
| 2013/0044743 A1* | 2/2013 | Zhang | H04W 28/18 370/338 |
| 2013/0170345 A1* | 7/2013 | Merlin | H04W 28/065 370/230 |
| 2013/0229959 A1* | 9/2013 | Ghosh | H04W 74/08 370/311 |
| 2013/0230028 A1* | 9/2013 | Calcev | H04W 72/1231 370/336 |
| 2013/0235720 A1* | 9/2013 | Wang | H04W 28/0278 370/229 |
| 2015/0139116 A1* | 5/2015 | Wang | H04B 7/0408 370/329 |

FOREIGN PATENT DOCUMENTS

| | | | | |
|---|---|---|---|---|
| WO | WO 03/026221 | * | 3/2003 | ........... H04L 12/413 |
| WO | WO 2009/114574 A2 | | 9/2009 | |

OTHER PUBLICATIONS

International search report for PCT/KR2013/008734 filed on Sep. 30, 2013.

* cited by examiner

| 810 | 820 | 830 | | | |
|---|---|---|---|---|---|
| MCS | AP ID | SECTOR ID | RESERVED | CRC | TAIL |
| 4 | 16 BIT | 5 BIT | 1 BIT | 4 | 6 |

METHOD AND APPARATUS FOR DISCOVERY OF SECTOR IN WIRELESS LOCAL AREA NETWORK SYSTEM

TECHNICAL FIELD

The present invention relates to a sector discovery method and apparatus in a wireless local area network (WLAN) system.

BACKGROUND ART

In a wireless local area network (WLAN) system, when a plurality of stations (STAs) 111 and 112 located in a same basic service set (BSS) perform data transmission with respect to an access point (AP) 100 simultaneously, air-time collision inevitably occurs due to characteristics of a channel access scheme in view of collision avoidance, which is a hidden node problem.

In addition, when STAs located in different adjacent BSSs perform data transmission, interference may also be generated, thereby reducing efficiency of data transmission originally desired.

To relieve such problems, opportunities to access STAs may be temporally distributed for each BSS to avoid collision on frequency resources. However, the foregoing expected object may also be achieved by spatially distributing channel access attempts using an AP including a sector antenna. Such a technology is called sectorization.

In general, the sector antenna includes a plurality of planar antennas and may have a function of selectively switching transmission antennas and reception antennas. A device functioning as the sector antenna may be implemented using a combination of multiple antennas and signal processing such as beam forming. The sectorization has neither been used in the conventional WLAN nor technically discussed, due to an operational inconvenience.

However, in a recent WLAN standard considering a sensor application, indoor/outdoor M2M, and extended range cellular offloading as a main application, coverage is increased up to approximately 1 kilometer (km). Furthermore, since a number of STAs managed by a single BSS is increased up to several thousands to several tens of thousands, effective data transmission is unable to be performed due to the hidden node problem and an overlapping basic service set (OBSS) interference problem. Accordingly, there is a desire for technology that may reduce such issues by spatially dividing operations of STAs through sectorization in the WLAN system.

DISCLOSURE OF INVENTION

Technical Goals

An aspect of the present invention provides a method and apparatus for solving the issue of having a delay when a station (STA) of a wireless local area network (WLAN) system initially enters a basic service set (BSS) in which sectorized communication is being performed.

Another aspect of the present invention also provides a method of enabling the STA and an access point (AP) to discover a sector including the STA such that the STA may immediately perform sectorized mode communication.

Technical Solutions

According to an aspect of the present invention, there is provided a sector discovery method of an access point (AP) in a wireless local area network (WLAN) system, the method including setting, by an AP in a WLAN system, an omni-beacon interval for transmitting an omnidirectional beacon and sector beacon intervals for transmitting a sector beacon with respect to one of a plurality of sectors which are spatially divided, transmitting the sector beacon to a current sector among the plurality of sectors, transmitting, to the current sector, a transmission frame indicating sectorized transmission or a transmission frame indicating omnidirectional transmission, in a sector interval between the sector beacon intervals, and receiving, from a terminal located in the current sector, a response frame indicating an association performed by receiving the transmission frame indicating the sectorized transmission.

According to another aspect of the present invention, there is also provided a sector discovery method of an AP in a WLAN system, the method including setting, by an AP in a WLAN system, an omni-beacon interval for transmitting an omnidirectional beacon and sector beacon intervals for transmitting a sector beacon with respect to one of a plurality of sectors which are spatially divided, receiving a probe request for association with the AP in a sector interval between the sector beacon intervals, and broadcasting omnidirectionally a probe response in response to the probe request, sweeping, to the plurality of sectors, a discovery frame including corresponding sector information in the sector interval between the sector beacon intervals, and receiving, from a terminal receiving the discovery frame, an association request frame including a sector identifier.

According to still another aspect of the present invention, there is also provided a sector discovery method of an AP in a wireless local area network WLAN system, the method including receiving a sector beacon from an AP of the WLAN system, which sets an omni-beacon interval for transmitting an omnidirectional beacon and sector beacon intervals for transmitting the sector beacon with respect to one of a plurality of sectors divided spatially, receiving, in a sector interval between the sector beacon intervals, a transmission frame indicating sectorized transmission or a transmission frame indicating omnidirectional transmission, generating a response frame indicating an association performed by receiving the transmission frame indicating the sectorized transmission, and transmitting the response frame to the AP.

According to yet another aspect of the present invention, there is also provided a sector discovery method of an AP in a WLAN system, the method including receiving a probe response omnidirectionally transmitted in a sector interval between sector beacon intervals from an AP of the WLAN system, which sets an omni-beacon interval for transmitting an omnidirectional beacon and the sector beacon intervals for transmitting a sector beacon with respect to one of a plurality of sectors divided spatially, receiving a discovery frame including corresponding sector information in the sector interval between the sector beacon intervals, and attempting an association with one of the plurality of sectors based on the discovery frame.

According to further another aspect of the present invention, there is also provided an AP of a WLAN system, including a beacon interval setting unit to set an omni-beacon interval for transmitting an omnidirectional beacon and sector beacon intervals for transmitting a sector beacon with respect to one of a plurality of sectors which are spatially divided, a beacon generator to generate the sector beacon and an omni-beacon, a frame generator to generate a transmission frame indicating sectorized transmission or a transmission frame indicating omnidirectional transmission, a communicator to transmit the sector beacon to a current sector among the plurality of sectors, and a controller to control the communicator to transmit the transmission frame to the current sector in the sector interval between the sector beacon intervals, wherein the communicator receives, from a terminal located in the current sector, a response frame indicating association performed by receiving the transmission frame indicating the sectorized transmission.

According to still another aspect of the present invention, there is also provided an AP of a WLAN system, including a beacon interval setting unit to set an omni-beacon interval for transmitting an omnidirectional beacon and sector beacon intervals for transmitting a sector beacon with respect to one of a plurality of sectors which are spatially divided, a beacon generator to generate the sector beacon and an omni-beacon, a communicator to receive a probe request to be associated with the AP in a sector interval between the sector beacon intervals, and broadcast omnidirectionally a probe response in response to the probe request, and a controller to control the communicator to perform sweeping on a discovery frame including corresponding sector information to the plurality of sectors in the sector interval between the sector beacon intervals, wherein the communicator receives an association request frame including a sector identifier from a terminal receiving the discovery frame.

According to yet another aspect of the present invention, there is also provided an STA of a WLAN system, including a communicator to receive a sector beacon from an AP of the WLAN system, and receive a transmission frame indicating sectorized transmission or a transmission indicating omnidirectional transmission, in a sector interval between sector beacon intervals, a frame generator to generate a response frame indicating association performed by receiving the transmission frame indicating the sectorized transmission, and a controller to control the communicator to transmit the response frame to the AP.

According to still another aspect of the present invention, there is also provided an STA of a WLAN system, including a communicator to receive a sector beacon from an AP of the WLAN system, and receive a discovery frame including corresponding sector information, in a sector interval between sector beacon intervals, a controller to attempt an association with one of a plurality of sectors based on the discovery frame, and a frame generator to generate a probe request frame for the association with the AP.

Advantageous Effects

According to example embodiments, it is possible for a station (STA) and an access point (AP) quickly discover a sector including the STA such that the STA immediately performs sectorized mode communication.

BEST MODE FOR CARRYING OUT THE INVENTION

Figure 1:
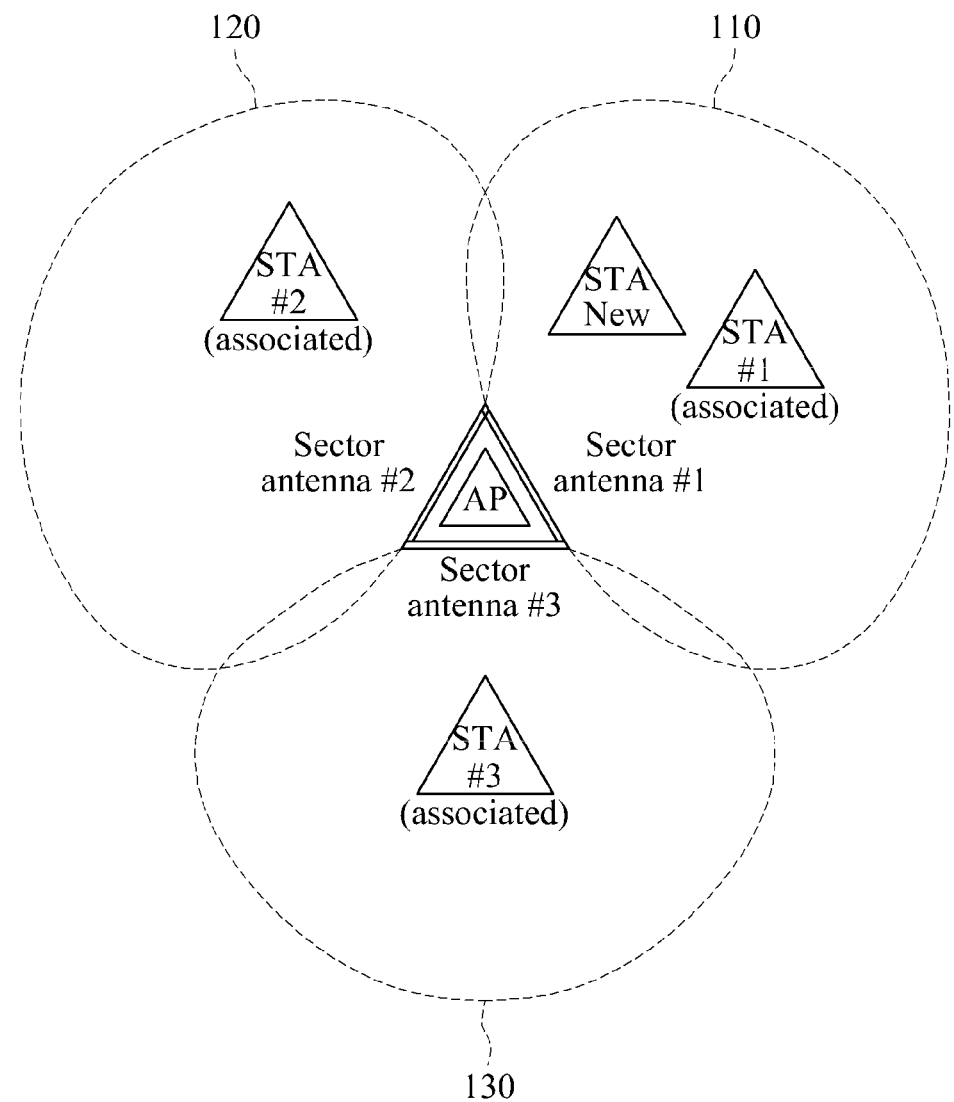
FIG. 1 is a diagram illustrating a configuration of a wireless local area network (WLAN) system according to an embodiment of the present invention.

Reference will now be made in detail to embodiments of the present invention, examples of which are illustrated in the accompanying drawings, wherein like reference numerals refer to the like elements throughout. The embodiments are described below in order to explain the present invention by referring to the figures.

FIG. 1 is a diagram illustrating a configuration of a wireless local area network (WLAN) system according to an embodiment of the present invention.

Referring to FIG. 1, an example of a spatial configuration of a basic service set (BSS) in a WLAN system having three sectors is described. Here, a number of sectors may be greater than or equal to "4".

In FIG. 1, an access point (AP) may perform sectorized transmission and reception on a single sector using high-directivity sector antennas. The sectorized transmission and reception may be also referred to as high-directivity communication.

In such an environment as described in FIG. 1, the AP may temporally divide a switching time of a sector antenna, and the sector antenna may be instructed to manage transmission and reception of a station (STA) located in a predetermined direction. The AP may temporally divide the switching time for each of a first sector 110, a second sector 120, and a third sector 130.

An STA of FIG. 1 may indicate a station. For example, an STA #1 may be associated with the first sector 110. Thus, the STA #1 may receive a signal transmitted by a sector antenna #1, and may be disallowed to receive a signal transmitted by a sector antenna #2.

The AP may switch all sector antennas on to perform omnidirectional transmission and reception. The omnidirectional transmission and reception may be also referred to as an omni-mode communication or an omni-mode operation.

Passive scanning and active scanning may be applied to the WLAN system as a scanning scheme for discovering an AP or an STA. The passive scanning may refer to a scheme in which the STA sequentially listens to each channel of a wireless medium while waiting for a beacon frame, thereby acquiring information associated with the AP. Since the STA waits for receiving a beacon for each channel, AP discovery may be delayed longer in the passive scanning than the active scanning.

In a case of the sectorized communication, transmission and reception may be improperly performed in a sector mode until the STA and the AP recognize a sector in which the STA is included, in a predetermined BSS. For example, when the AP does not perform transmission and reception with respect to a sector including the STA in a process in which the STA initially enters the BSS and performs scanning, the STA may not immediately discover the sector including the STA. In this example, despite a successful association, the sectorized communication may be improperly performed until the STA discover the sector including the STA.

When the AP operates in the sector mode rather than an omni-mode, and the STA transmits a probe request to quickly discover the AP, the STA may improperly receive a probe response in the sector interval on which the AP does not perform transmission and reception. Thus, a delay may result in a process of the scanning.

When the AP allows omni-transmission for receiving an association and transmitting the probe response in response to the probe request, the STA may immediately receive the probe response from the AP. In addition, although the association is immediately performed, the STA may not recognize the sector including the STA. Thus, the STA may perform communication in an omni-transmission interval until the sector including the STA is discovered. Also, the STA may improperly perform the communication in the sector mode. In the sectorized communication, the AP may group the STA for each sector. STA grouping is preferred to be performed when the STA is in a process of the association so as to allocate an association identifier (AID). When the STA and the AP are not provided notification of a sector including a corresponding STA, a group for each sector may not be determined in the process of the association, and the AID is temporarily allocated. Also, an overhead in which the AID is reallocated after the STA discovers the sector including the STA may occur.

Figure 2:
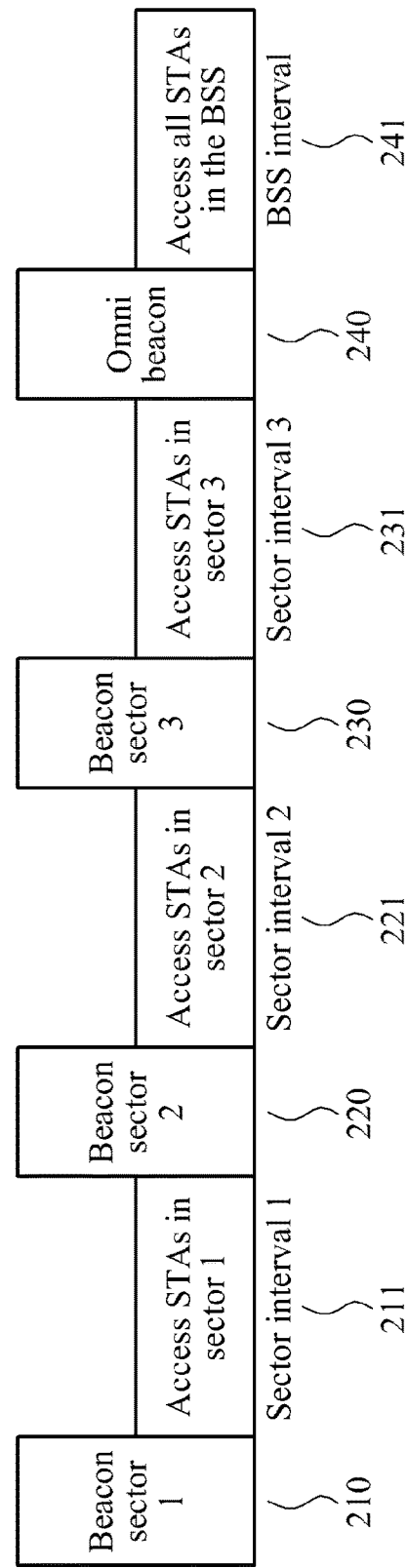
FIG. 2 is a diagram illustrating an example of a sectorized communication scenario in the WLAN system of FIG. 1.

FIG. 2 is a diagram illustrating an example of a sectorized communication scenario in the WLAN system of FIG. 1.

Referring to FIG. 2, a transmission and reception interval of a signal may be configured with spatially divided sectors. A sector beacon may be transmitted at each time the sectors begin. An STA included in a corresponding sector may be allowed to listen to a beacon and communicate with an AP. An omni-transmission interval may also be provided in addition to a sector interval. In this instance, the STA may communicate with the beacon and the AP based on omni-transmission so as to perform a communication irrespective of a sector including the STA.

Accordingly, in an example of the sectorized communication scenario, the AP may set, with respect to one of a plurality of sectors divided spatially, sector beacon intervals in which a beacon sector 1 210, a beacon sector 2 220, and a beacon sector 230 is transmitted and an omni-beacon interval 240 in which an omnidirectional beacon is transmitted.

In FIG. 2, the beacon sector 1 210 indicates a sector beacon transmitted to the first sector 110 of FIG. 1, the beacon sector 2 220 indicates a sector beacon transmitted to the second sector 120 of FIG. 1, and the beacon sector 3 indicates a sector beacon transmitted to the third sector of FIG. 1.

In a BSS interval 241, the AP may operate in an omni-mode.

In FIG. 2, a sector interval 1 211 may be an interval in which a sector antenna #1 is switched on, a sector interval 2 221 may be an interval in which a sector antenna #2 is switched on, and a sector interval 3 231 may be an interval in which a sector antenna #3 is switched on.

Hereinafter, it is assumed that the STA initially entering a BSS may apply the omni-mode to transmit a probe request/probe response, and perform association in order to perform an active scanning, without restrictions.

For example, a point in time at which the STA #3 of the third sector 130 enters the BSS may be included in the sector interval 1 211 in which the AP is communicating with the first sector 110. In this instance, the STA #3 may not receive a sectorized transmission and reception frame of the first sector 110. Although an STA receives the probe request/probe response to discover an AP and performs the association in the omni-mode, the STA may not discover the sector including the STA at a point in time of the association. Thus, the STA #3 may be not grouped to the third sector 130, and may not perform the sectorized communication. When the STA #3 listens to the beacon sector 3 230, the STA #3 may recognize the sector in which the STA #3 is included. The AP may recognize that a communication is available in the STA #3 and the sector interval 3 231, and also recognize that the STA #3 is included in the third sector 130. Thus, the AP may perform a grouping on the STA #3 in the sector interval 3 231, and reallocate the AID.

In a process of the STA 3# and the AP recognizing the sector including the STA #3, a delay and an overhead causing an AID reassignment may occur.

Hereinafter, a description of a scheme of reducing the delay and the overhead occurring in a process of discovering a sector will be provided with reference to FIGS. 3 through 8.

Figure 3:
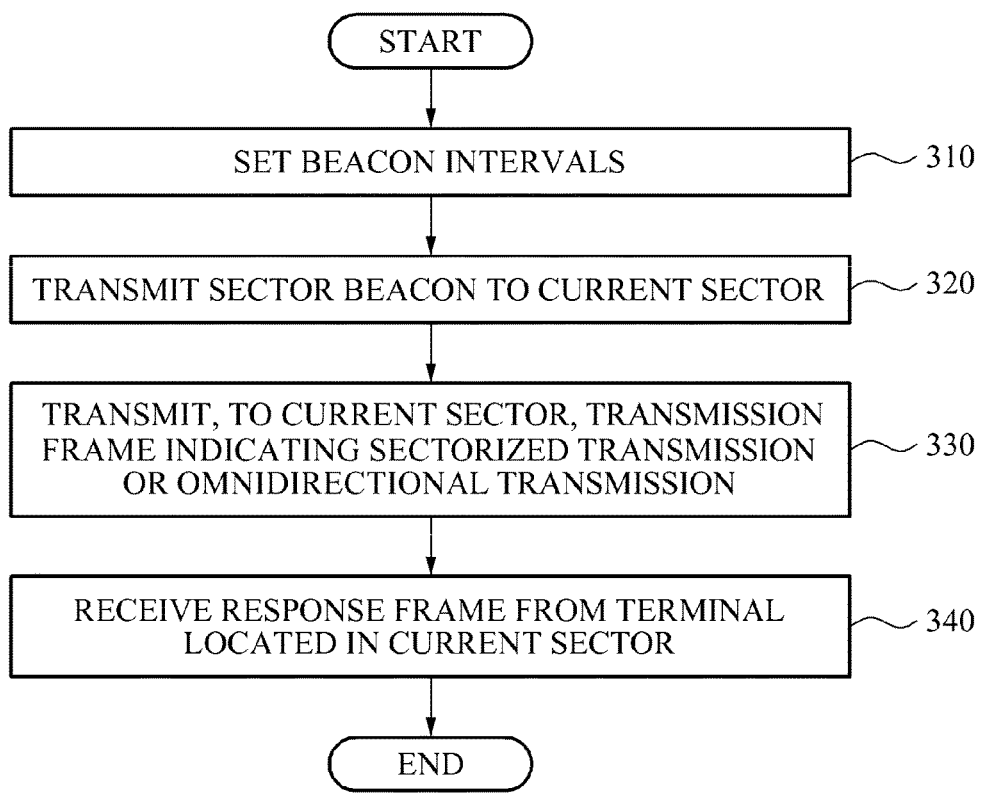
FIG. 3 is a diagram illustrating a sector discovery method of an access point (AP) in a WLAN system according to an embodiment of the present invention.

FIG. 3 is a diagram illustrating a sector discovery method of an AP in a WLAN system according to an embodiment of the present invention.

Referring to FIG. 3, in operation 310, the AP sets, with respect to one of a plurality of sectors divided spatially, sector beacon intervals for transmitting a sector beacon and an omni-beacon interval transmitting an omnidirectional beacon.

In this instance, beacon intervals may be set according to the example of the sectorized communication described in FIG. 2.

In operation 320, the AP may transmit the sector beacon to a current sector among the plurality of sectors.

Accordingly, the STA may receive the sector beacon from the AP of the WLAN system, which sets the sector beacon intervals and the omni-beacon interval.

For example, the current sector may be the first sector 110 of FIG. 1, and the sector beacon may be the beacon sector 1 210 of FIG. 2.

In operation 330, the AP may transmit, to the current sector, a transmission frame indicating sectorized transmission or a transmission frame indicating omnidirectional transmission, in a sector interval between the sector beacons As an example embodiment, the AP may provide an indication of the sectorized transmission or an indication of the omnidirectional transmission to a frame, for example, the beacon, the probe response, the association response frame, and the like related to the active scanning, a passive scanning, or the association. In this instance, the STA may use the frame received from the AP to discover the sector including the STA. When the sector has been already discovered, the STA may use the frame to discover an alternative sector during a process of the sectorized transmission. Thus, the AP and the STA may perform sector discovery and sector training using the beacon, the probe response, and the association response frame.

As another example embodiment, the AP may provide the indication of the sectorized transmission or the indication of the omnidirectional transmission to all frames to be transmitted. As a number of frames including the indication of the sectorized transmission or the indication of the omnidirectional transmission increases, a length of time required for discovering the sector including the STA or a sector optimized for the STA may be shortened. Thus, the STA may use all frames allowing listening to discover the sector including the STA. Once the sector is discovered, the STA may use the frame to discover an alternative sector during the process of the sectorized transmission. Thus, the sector discovery and the sector training may be performed using all the frames transmitted by the AP.

The STA may receive, in the sector interval between the sector beacon intervals, the transmission frame indicating the sectorized transmission or the transmission frame indicating the omnidirectional transmission.

The AP may provide, to the transmission frame, an indication of sectorized mode transmission or an indication of omni mode transmission. For example, the AP may provide, to a preamble or a medium access control (MAC) header, "1" corresponding to the sectorized mode transmission, or "0" corresponding to the omni mode transmission.

In operation 340, the AP may receive, from a terminal located in the current sector, a response frame indicating an association performed by receiving the transmission frame indicating the sectorized transmission. For example, the STA may generate the response frame indicating the association performed by receiving the transmission frame indicating the sectorized transmission, thereby transmitting the generated response frame to the AP.

The AP may transmit the probe response based on the sectorized mode transmission or the omni mode transmission, in response to the probe request. When the probe response is transmitted based on the sectorized mode transmission, the probe response includes the indication of the sectorized transmission, and the STA is allowed to listen to a corresponding probe response, the STA may immediately discover the sector in which the STA is included. However, when the probe response is transmitted based on the omni mode transmission, the STA may not recognize the sector in which the STA is included although the STA has received the probe response from the AP. In this case, the AP may not recognize the sector in which the STA is included. In general, the AP may not be acknowledged about a location of the STA transmitting the probe request, in advance. Thus, the probe response may be transmitted based on the omni mode transmission in most cases.

However, when the STA entering the BSS receives a frame transmitted by a corresponding AP immediately before or after the passive scanning or the active scanning, and a corresponding frame includes the indication of the sectorized transmission, the STA may recognize that a current sector in which the STA is included corresponds to an interval in which the corresponding AP performs the sectorized mode transmission.

For example, when the AP performs the sectorized mode transmission on a frame in the first sector 110 including the STA #1, the STA #1 may listen to the frame and recognize that the STA #1 is currently included in the sector in which the AP performs the sectorized mode transmission, thereby requesting an association to the AP. In this instance, the STA #1 performs the association in the sector in which the STA #1 is included. Thus, the STA #1 may be grouped to the sector in which the STA #1 is included, and receive a sector assignment and an AID assignment concurrently with the association.

In a process of an association request, the STA #1 may indicate, to an association request frame, that the STA #1 listens to a frame transmitted by a corresponding AP based on the sectorized mode transmission, and then performs the association.

For example, the STA #1 may assign, to the preamble or the MAC header, an indication of "1" corresponding to a case in which the STA #1 listens to a sectorized mode transmission frame to perform the association request, or an indication of "0" corresponding to a case in which the STA #1 listens to an omni mode transmission frame to perform the association request.

When the indication of "1" is included in the association request transmitted by the STA #1, which indicates that the STA #1 has listened to a frame through the sectorized transmission of the AP and attempts the association, the AP may recognize a sector including the STA #1 and perform grouping on a sector-by-sector basis. Thus, the method of FIG. 3 may further include allocating an AID to a terminal located in a current sector.

When the transmission frame transmitted by the AP includes the indication of the sectorized transmission, the transmission frame may include identifier (ID) information or a number of the current sector in which the AP is performing transmission.

Also, the response frame transmitted to the AP by the STA may include the ID information and the number of the current sector.

When a frame is transmitted based on the sectorized mode transmission, the AP may provide, to the frame, an indication of a sector from which the frame is transmitted, in addition to an indication of, for example, "0" or "1" indicating whether the sectorized transmission is applied. For example, an indication of a sector number and an indication of an ID may be included in the frame to be transmitted. When the STA listens to a sectorized transmission frame and, in a process of an association request, transmits a frame to the AP by incorporating the sector number and the ID indicated in the sectorized transmission frame is transmitted by the AP, the AP may clearly verify the sector including the STA.

A delay may occur in a period of time between a time at which the STA listens to the sectorized transmission frame from the AP and a time at which the STA initiates the association request. During the period of time, the AP may initiate transmission and reception with respect to a next sector interval. In this instance, when the STA attempts the association with an association request indicating the STA has listened to the sectorized transmission frame and performs transmission, aside from an indication about an identifier such as a sector ID, the AP may improperly recognize a location of the STA.

However, when the STA incorporates the indication about the identifier such as the sector ID in the association request, the AP may properly recognize the sector including the STA, thereby preventing improper recognition as described above.

The AP and the STA may indicate sector information associated with a sector using the preamble and the MAC header.

Using one bit of the preamble may enable the AP and the STA to provide the indication of the sectorized transmission to a null data packet (NDP) type short frame in addition to a MAC frame. Thus, a type of a frame allowed to indicate whether the sectorized transmission is applied may be diversified. A MAC address of a corresponding AP may be used to identify an AP from which the corresponding frame has been transmitted.

In a case of transmitting the NDP type short frame not having the MAC address, listening to another frame may be necessary to identify an AP from which a corresponding NDP type short frame is transmitted. Also, since the NDP type short frame has a relatively few amount of extra bits, indicating information such as the sector ID may be restricted.

The AP and the STA may clearly recognize a frame based on the MAC address by using a frame control of the MAC header or a reserved bit of another MAC header. The frame control of the MAC header or the reserved bit of another MAC header may have a greater number of extra bits than the preamble. Thus, the AP may incorporate an indication of the sector ID to the sectorized transmission frame. Also, the STA may transmit the association request including the indication of the sector ID such that the AP may clearly recognize the sector including the STA.

When the STA entering the BSS receives the frame transmitted by the corresponding AP immediately before or after the passive scanning or the active scanning, and the corresponding frame includes an indication of the omni mode transmission, the STA may not determine a current sector in which the AP having transmitted the frame is performing transmission.

For example, the STA #3 located in the third sector 130 of FIG. 1 may enter the BSS in the sector interval 1 211 of FIG. 2.

In this example, the STA #3 may not receive a sectorized frame. When all frames additionally transmitted from a corresponding AP and received by the STA #3 correspond to omni mode transmission frames, the STA #3 (1) may await reception of a sectorized transmission frame from the AP to a sector including the STA #3, and attempt an association.

In addition, as another example, (2) the STA #3 may not wait for the sectorized transmission frame to be received by the sector including the STA #3, and perform the association on the corresponding AP in a state in which the sector including the STA #3 is not acknowledged.

In this instance, the STA #3 may indicate that the STA #3 listens to the frame transmitted by the AP through the omni mode transmission and requests the association, in a process of the association request.

Thus, the method of FIG. 3 may further include receiving, by an AP, a response frame indicating an association performed by receiving a transmission frame indicating an omnidirectional transmission, from another terminal located in the current sector, that is, the STA #3.

The STA #3 may provide an indication of "0" to the preamble or the MAC header included in the association request, and transmit, to the AP, the association request including the indication of "0".

In this instance, the AP may be aware that the STA #3 failed to discover the sector including the STA #3 and perform the association. Thus, the AP may perform grouping on the STA #3 such that the STA #3 may perform transmission in an omni transmission interval.

The STA #3 having performed the association may be able to communicate in the omni transmission interval although the STA is not acknowledged in the sector including the STA #3. Thus, when the STA #3 detects the sectorized transmission frame, for example, a frame or a beacon transmitted based on the sectorized transmission while using the omni transmission interval, the STA #3 may discover the sector including the STA #3 and request, to the AP, sector assignment or AID reassignment. From then, the STA #3 may be allowed to communicate in the corresponding sector.

After the sector is discovered, the STA #3 may continue to perform communication. When the STA #3 recognizes that the current sector does not correspond to an optimal sector for communication or enters another sector during communication, the STA #3 may listen to the sectorized transmission frame transmitted by the AP and request a sector reassignment to receive the sector reassignment.

Figure 4:
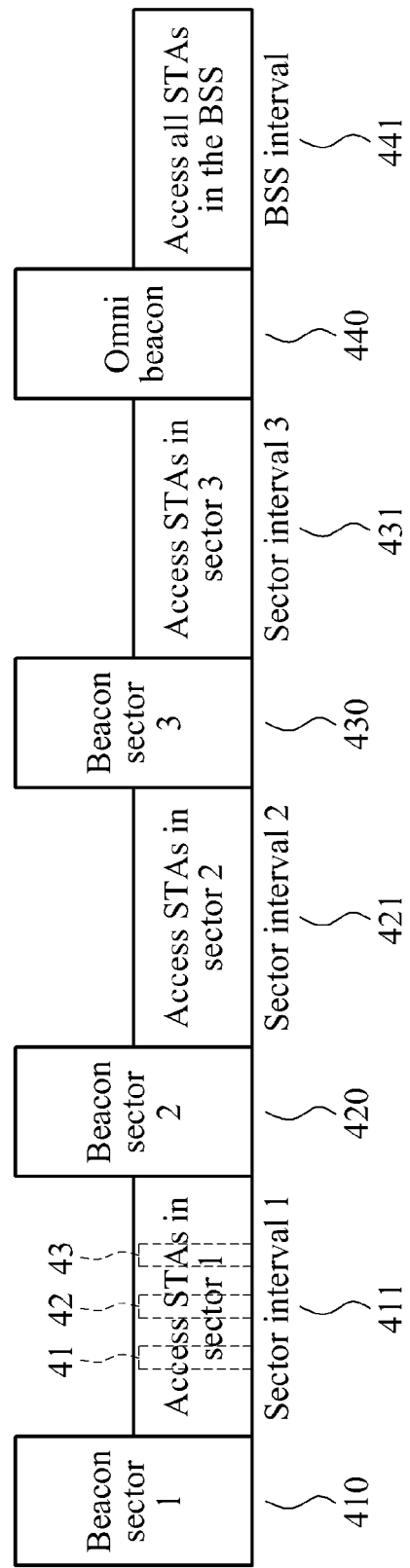
FIG. 4 is a diagram illustrating another example of a sectorized communication scenario in the WLAN system of FIG. 1.

FIG. 4 is a diagram illustrating another example of a sectorized communication scenario in the WLAN system of FIG. 1.

Referring to FIG. 4, an AP may set a beacon interval, receive a probe request for an association with the AP in a sector interval between sector beacon intervals, and unicast or broadcast omnidirectionally a probe response in response to the probe request.

In addition, the AP may perform sweeping, in the sector interval between the sector beacon intervals, on a discovery frame including corresponding sector information, with respect to a plurality of sectors.

In this instance, the AP may generate scheduling information indicating a transmission time of the discovery frame before transmitting the discovery frame, and incorporate the scheduling information in the probe response or a beacon. The AP may broadcast the scheduling information indicating the transmission time of the discovery frame in an omni-beacon interval or the sector beacon interval.

The AP may generate scheduling information indicating the transmission time of the discovery frame, and unicast or broadcast a probe response frame or a beacon including the scheduling information. Also, the scheduling information may be incorporated in an association response frame. Thus, an STA may receive the association response frame, the probe response, or the beacon including the scheduling information indicating the transmission time of the discovery frame.

Here, the sweeping may indicate transmitting, based on the sectorized transmission, a first frame 41, a second frame 42, and a third frame 43, each having a relatively small size set in advance. For example, the first frame 41 may be transmitted to the first sector 110 of FIG. 1, the second frame 42 may be transmitted to the second sector 120 of FIG. 2, and the third frame 43 may be transmitted to the third sector 130 of FIG. 1.

The AP may receive an association request frame including a sector ID from a terminal receiving the discovery frame.

Referring back to FIG. 4, the AP may assist the STA in quickly discovering a sector by sweeping a relatively small size of frame, for example, an NDP type short frame.

The AP may receive the probe request from the STA, transmit the probe response in response to the probe request, and transmit a discovery frame having a relatively small size. When a frame is transmitted by broadcasting, the STA and the other STAs adjacent to the STA transmitting the probe request may listen to the frame and use the frame.

The discovery frame having the relatively small size may include a compressed service set identification (SSID) in which an SSID of the AP is compressed, or a short basic service set identification (BSSID) in which a MAC address of the AP is compressed, thereby identifying the AP.

In addition, the discovery frame may include a corresponding sector ID to which corresponding discovery frame is transmitted.

The AP may use an NDP type discovery frame to reduce a size of the discovery frame. The NDP type discovery frame may include an AP ID including the compressed SSID or the short BSSID, and the corresponding sector ID to which the discovery frame is transmitted. The AP may additionally transmit an announcement frame indicating that transmission of the NDP type discovery frame is initiated, immediately before transmitting the NDP type discovery frame. In this case, the NDP type discovery frame may be transmitted by the AP transmitting the announcement frame, and the STA may verify an address of the AP performing transmission included in the announcement frame. Thus, the AP ID may be omitted in the NDP discovery frame. When the NDP type discovery frame is transmitted in a sector ID order, for example, an order of a sector 1, a sector 2, and a sector 3, the NDP type discovery frame in which the sector ID is omitted may be transmitted.

The AP may perform the sweeping for each sector, and the STA may receive the probe response. When the sweeping is performed on the discovery frame, the discovery frame may be transmitted to a sector in which the STA is included. Thus, the STA may receive the discovery frame and recognize the sector in which the STA is included.

Subsequently, the STA may recognize the sector including the STA based on the discovery frame, and perform an association by transmitting an association request including the sector ID. The AP may also recognize the sector including the STA, and allocate the STA to the sector in a process of the association.

Since the discovery frame is transmitted to each sector through the sweeping, the STA may recognize an optimal sector based on the discovery frame. Also, the STA may immediately receive the discovery frame including an indication of the sector after the probe response is received, thereby ensuring a fast discovery.

The AP may incorporate an indication of a period of time until transmission time of a next discovery frame in the probe response which is a response to the probe request transmitted by the STA. The indication of the period of time until transmission time of the next discovery frame may be incorporated in the probe response and a beacon transmitted by the AP so as to be unicast or broadcast, and also incorporated in the association response frame.

The period of time until transmission time of the next discovery frame may be also referred to as a duration to next discovery frame.

Based on the duration to the next discovery frame, when the next discovery frame is transmitted, the STA may wait for a while, and receive the next discovery frame to recognize a sector number of the STA, thereby performing the association request.

When the STA is aware, based on the duration to next discovery frame, that the next discovery frame is not transmitted either immediately or ever, the STA may perform the association with the AP in a state in which the sector is not acknowledged. Then, the STA may request AID reassignment based on the discovery frame, the sector beacon, or the sectorized transmission frame, which are transmitted subsequently, and be allocated to the sector including the STA. A point in time at which the discovery frame is transmitted after the association is performed may be indicated in the probe response frame, the association response frame, or the beacon received subsequently so as to be acknowledged based on the duration to next discovery frame in advance.

When a predetermined period of time is required for receiving the discovery frame, the STA may sleep until the discovery frame is received, or perform a scanning with respect to another AP.

The AP may schedule the transmission time of the discovery frame.

For example in a process of restricted access window (RAW) scheduling, the AP may set an empty slot for transmission of the discovery frame and transmit the discovery frame, thereby achieving a traffic distribution effect, preventing an occurrence of a collision, and enhancing channel utilization.

When the AP transmits the discovery frame by broadcasting, a plurality of STAs may use the discovery frame to discover sectors through a single discovery frame transmission at a time. Thus, an amount of traffic may be reduced.

In an environment in which a collision frequently occurs due to an excessive number of STAs, the AP may schedule the discovery frame transmission in a time when a channel is empty and thus, use the channel efficiently.

When an amount of traffic is relatively large, the AP may impede a frequency of transmitting the discovery frame such that the plurality of STAs shares a single discovery frame.

The STA may receive the discovery frame at a corresponding point in time, based on the duration to next discovery frame included in the probe response. Since the STA previously recognized the point in time at which the discovery is received, the STA may sleep or search for another AP during a period of waiting time. When the STA performs the association in a state in which the sector is not acknowledged, the STA may also receive the discovery frame at a corresponding point in time based on the duration to a next discovery frame included in the association response to discover the sector, thereby requesting the sector assignment and the AID reassignment. Although the sector is allocated, the STA may listen to the discovery frame at the corresponding time indicated in the duration to next discovery frame in order to discover an alternative sector or discover another sector due to a relocation of the STA. Through this process, the STA may discover an optimal sector and request the sector assignment and the AID reassignment. Since the STA may previously recognize the point in time of receiving the discovery frame, the STA may sleep during the period of waiting time.

As described above, the discovery frame may be used in an active scanning and a passive scanning. Also, the discovery frame may be used for discovering the optimal sector after the association is performed. The discovery frame transmitted in a process of the active scanning of another STA may be used in the passive scanning of the other STA.

When the probe request is not received, the AP may also transmit the discovery frame between beacons to increase a speed of passive scanning. In this instance, the AP may include an indication on the duration to next discovery frame in the omni-beacon. The STA may wait until the discovery frame is received based on the duration to a next discovery frame, and identify the sector to perform the association. When a length of the duration to next discovery frame is relatively long, the STA may need to wait for a long time. In this case, the STA may perform the association without recognition of the sector, and then determine the sector.

When the STA listens to the sectorized beacon, the STA may be included in the corresponding sector. Thus, the STA may perform the association with the corresponding sector without listening to the discovery frame, and receive the sector assignment. However, the duration to a next discovery frame may be indicated to the sectorized beacon. In this instance, the STA may receive the discovery frame at the point in time at which the corresponding discovery frame is transmitted in order to discover the alternative sector, and request the sector assignment to the AP by selecting the optimal sector.

After the association has been performed, the STA may also receive the discovery frame at the point in time indicated in the omni-beacon or the sectorized beacon. When the optimal sector is discovered, the STA may request, to the AP, the reassignment to the corresponding sector.

For example, the STA may receive the probe response transmitted omnidirectionally, receive the discovery frame including the corresponding sector information in the sector interval between the sector beacons, and attempt the association with one of the plurality of sectors based on the discovery frame.

In this instance, the probe response may include scheduling information indication a transmission time of the discovery frame, and the STA may attempt the association with one of the plurality of sectors based on the scheduling information.

In addition, the STA not transmitting the probe request may also listen to the probe response transmitted from the AP to a different STA or the probe response transmitted by broadcasting, and recognize the transmission time of the discovery frame. In this case, all of the STAs attempting the association may not be fully required to transmit the probe request. Thus, a number of probe response frames transmitted by the AP may be reduced.

Figure 5:
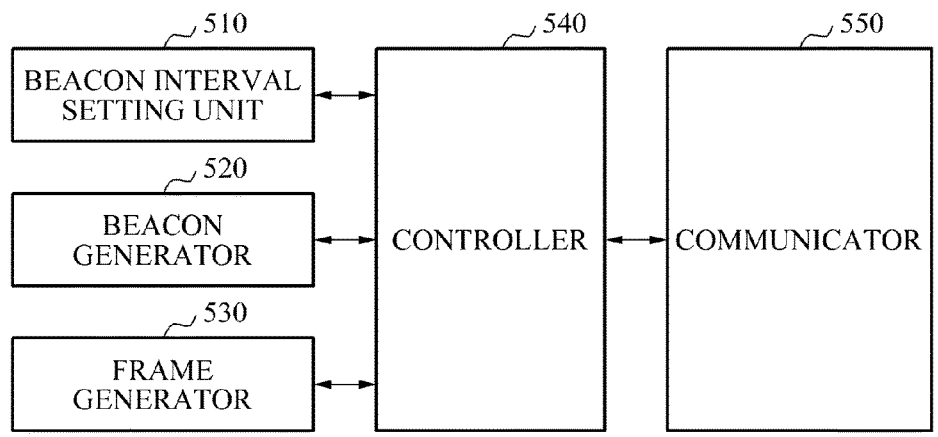
FIG. 5 is a diagram illustrating a configuration of an AP according to an embodiment of the present invention.

FIG. 5 is a diagram illustrating a configuration of an AP according to an embodiment of the present invention.

Referring to FIG. 5, an AP 500 may include a beacon interval setting unit 510, a beacon generator 520, a frame generator 530, a controller 540, and a communicator 550.

The beacon interval setting unit 510 may set an omni-beacon interval for transmitting an omnidirectional beacon and sector beacon intervals for transmitting a sector beacon, with respect to one of the plurality of sectors which are spatially divided.

The beacon generator 520 may generate a sector beacon and an omni-beacon.

The frame generator 530 may generate a transmission frame indicating sectorized transmission or a transmission frame indicating omnidirectional transmission.

The controller 540 may control the communicator 550 to transmit the transmission frame to a current sector, in a sector interval between the sector beacon intervals.

In addition, the controller 540 may control the communicator 550 to perform sweeping on a discovery frame including corresponding sector information with respect to the plurality of sectors, in the sector interval between the sector beacon intervals.

The communicator 550 may transmit the sector beacon to the current sector among the plurality of sectors. In this instance, the communicator 550 may receive, from a terminal located in the current sector, a response frame indicating the association performed by receiving the transmission frame indicating the sectorized transmission.

In addition, the communicator 550 may receive a probe request for the association with the AP in the sector interval between the sector beacon intervals, and unicast or broadcast omnidirectionally a probe response in response to the probe request.

Also, the communicator 550 may receive an association request frame including a sector ID from a terminal receiving the discovery frame.

Figure 6:
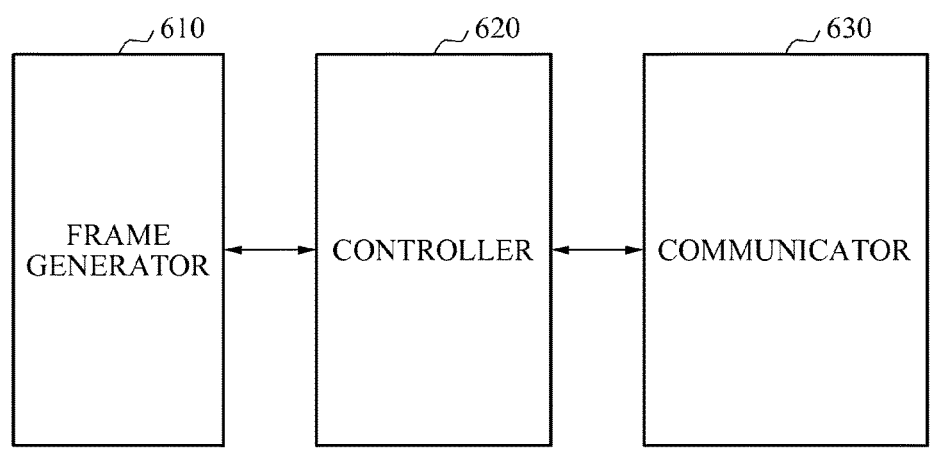
FIG. 6 is a diagram illustrating a configuration of a station (STA) according to an embodiment of the present invention.

FIG. 6 is a diagram illustrating a configuration of an STA according to an embodiment of the present invention.

Referring to FIG. 6, an STA 600 may include a frame generator 610, a controller 620, and a communicator 630.

The frame generator 610 may generate a response frame indicating an association performed by receiving a transmission frame indicating sector transmission.

Also, the frame generator 610 may generate a probe request frame for an association with an AP.

The controller 620 may control the communicator to transmit the response frame to the AP.

Also, the controller 620 may attempt the association with one of a plurality of sectors based on a discovery frame.

The communicator 630 may receive a sector beacon frame from the AP of a WLAN system, and receive, in a sector interval between sector beacon intervals, a transmission frame indicating sectorized transmission or a transmission frame indicating omnidirectional transmission.

Also, the communicator 630 may receive the sector beacon from the AP of the WLAN system, and receive the discovery frame including corresponding sector information in the sector interval between the sector beacon intervals.

Figures 7, 8:
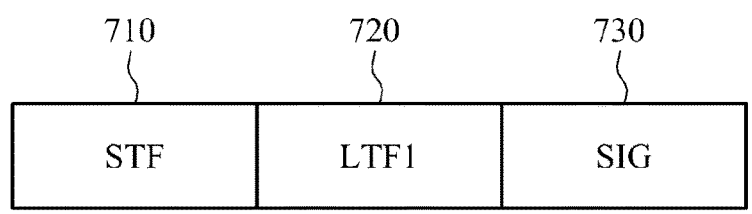
FIG. 7 is a diagram illustrating a configuration of a null data packet (NDP) type short frame according to an example embodiment.
FIG. 8 is a diagram illustrating a configuration of a signal (SIG) field according to an example embodiment.

FIG. 7 is a diagram illustrating a configuration of an NDP type short frame according to an example embodiment.

Referring to FIG. 7, the NDP type short frame may include a short training field (STF) 710 indicating a short training field for initial synchronization and signal detection, a long training field (LTF) 1 720 indicating a long training field for estimating a channel or a signal-to-interference-noise ratio (SINR), and a signal (SIF) field 730 indicating NDP frame control information.

In this instance, sector information may be included in the SIG field 730 of the NDP type short frame. Also, the SIG field 730 may include sector ID information and ID information of an AP.

FIG. 8 is a diagram illustrating a configuration of a SIG field according to an example embodiment.

Referring to FIG. 8, the SIG field may include a modulation and coding scheme (MCS) 810, an AP ID 820, and a sector ID 830. The SIG field may also include a reserved bit indicating a bit reserved for a subsequent use, a cyclic redundancy check (CRC) used for including information for correcting an error, and a bit tail included for adjusting a predetermined length.

The AP ID may be an address used for identifying the AP. The AP ID may use a hash value or the CRC of the SSID, a portion of the hash value or a portion of the CRC of the SSID, or a compressed BSSID.

The sector ID may refer to an ID used for identifying each sector of a corresponding AP. The MCS may indicate a frame type of a corresponding NDP type short frame.

A discovery frame may be generated using a quality of service (QoS) null frame in 802.11 communication standards. In this instance, the AP may be identified using a MAC address included in the QoS null frame. When the discovery frame is transmitted in a sector ID order, for example, an order of a sector 1, a sector 2, and a sector 3, the discovery frame in which the sector ID is omitted may be transmitted.

The method according to the above-described embodiments may be recorded in non-transitory computer-readable media including program instructions to implement various operations embodied by a computer. The media may also include, alone or in combination with the program instructions, data files, data structures, and the like. Examples of non-transitory computer-readable media include magnetic media such as hard disks, floppy discs, and magnetic tape; optical media such as CD ROM discs and DVDs; magneto-optical media such as optical discs; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described embodiments, or vice versa.

Although a few embodiments of the present invention have been shown and described, the present invention is not limited to the described embodiments. Instead, it would be appreciated by those skilled in the art that changes may be made to these embodiments without departing from the principles and spirit of the invention, the scope of which is defined by the claims and their equivalents.

The invention claimed is:

1. A sector discovery method of an access point (AP) in a wireless local area network (WLAN) system, the method comprising:
setting an omni-beacon interval including an omnidirectional beacon transmission time and a time interval before a next beacon transmission time, and setting sector beacon intervals each including a sector beacon transmission time and a time interval before a next beacon transmission time with respect to one of a plurality of sectors which are spatially divided;
in the omni-beacon interval, transmitting the omnidirectional beacon in an omnidirectional mode, the omnidirectional beacon including an indication of omnidirectional mode transmission;
in each of the sector beacon intervals, transmitting a corresponding sector beacon to a corresponding sector among the plurality of sectors in a sectorized mode, the corresponding sector beacon including an indication of sectorized mode transmission and a sector identifier of the corresponding sector;
receiving, from a station, an association request for requesting an association to the AP, the association request being generated by the station based on at least one of the omnidirectional beacon and sector beacons; and
during the association in response to the association request, allocating an identifier for a group of the station for allowing the station to transmit during a specific sector time duration or during an omnidirectional time duration,
wherein beacons transmitted by the AP are the omnidirectional beacon and the sector beacon, transmission times of every two consecutive beacons are temporally spaced apart by a beacon interval regardless of type of beacon, and configured beacon intervals are the omni-beacon interval and the sector beacon interval.

2. The method of claim 1, wherein the allocating the group identifier comprises:
in response to the association request being generated by the station based on a first sector beacon from among the sector beacons, allocating, to the station, a sectorized group corresponding to a first sector in which the first sector beacon is transmitted.

3. The method of claim 2, wherein the allocating the group identifier further comprises:
in response to the association request being generated by the station based on the omnidirectional beacon, allocating an omnidirectional group to the station.

4. The method of claim 1, further comprising:
receiving, from the station, an allocation request frame including an optimal sector identifier, the optimal sector identifier indicating an optimal sector selected by the station; and
allocating, to the station, a sectorized group corresponding to the optimal sector.

5. An access point (AP) in a wireless local area network (WLAN) system, the AP comprising:
a processor configured to set an omni-beacon interval including an omnidirectional beacon transmission time and a time interval before a next beacon transmission time, and to set sector beacon intervals each including a sector beacon transmission time and a time interval before a next beacon transmission time with respect to one of a plurality of sectors which are spatially divided;
a transmitter configured to:
in the omni-beacon interval, transmit the omnidirectional beacon in an omnidirectional mode, the omnidirectional beacon including an indication of omnidirectional mode transmission, and
in each of the sector beacon intervals, transmit a corresponding sector beacon to a corresponding sector among the plurality of sectors in a sectorized mode, the corresponding sector beacon including an indication of sectorized mode transmission and a sector identifier of the corresponding sector; and
a receiver configured to receive, from a station, an association request for requesting an association to the AP, the association request being generated by the station based on at least one of the omnidirectional beacon and sector beacons,
wherein the processor is further configured to allocate an identifier for a group of the station for allowing the station to transmit during a specific sector time duration or during an omnidirectional time duration, during the association in response to the association request, and
wherein beacons transmitted by the AP are the omnidirectional beacon and the sector beacon, transmission times of every two consecutive beacons are temporally spaced apart by a beacon interval regardless of type of beacon, and configured beacon intervals are the omni-beacon interval and the sector beacon interval.

6. A sector discovery method of a station in a wireless local area network (WLAN) system, the method comprising:
receiving, by the STA from an access point (AP), at least one of omnidirectional beacon or at least one sector beacon, wherein:
the omnidirectional beacon in an omnidirectional mode is received in the omni-beacon interval, the omnidirectional beacon includes an indication of omnidirectional mode transmission, the omni-beacon interval includes an omnidirectional beacon transmission time and a time interval before a next beacon transmission time, and
the at least one sector beacon in a sectorized mode is received in corresponding sector beacon interval, each of the at least one sector beacon corresponds to a sector among a plurality of sectors, each of the at least one sector beacon includes an indication of sectorized mode transmission and a sector identifier of the corresponding sector, and each of sector beacon intervals includes a sector beacon transmission time and a time interval before a next beacon transmission time with respect to one of the plurality of sectors which are spatially divided; and
transmitting, to the AP, an association request for requesting an association to the AP, the association request being generated by the station based on at least one of the omnidirectional beacon and the at least one sector beacon,
wherein, during the association in response to the association request, an identifier for a group of the station is allocated by the AP for allowing the station to transmit during a specific sector time duration or during an omnidirectional time duration, and
wherein beacons transmitted by the AP are the omnidirectional beacon and the sector beacon, transmission times of every two consecutive beacons are temporally spaced apart by a beacon interval regardless of type of beacon, and configured beacon intervals are the omni-beacon interval and the sector beacon interval.

7. A station in a wireless local area network (WLAN) system, the station comprising:
a receiver;
a transmitter; and
a processor,
wherein the processor is configured to:
receive, using the receiver, from an access point (AP), at least one of omnidirectional beacon or at least one sector beacon, wherein:
he omnidirectional beacon in an omnidirectional mode is received in the omni-beacon interval, the omnidirectional beacon includes an indication of omnidirectional mode transmission, the omni-beacon interval includes an omnidirectional beacon transmission time and a time interval before a next beacon transmission time, and
the at least one sector beacon in a sectorized mode is received in corresponding sector beacon interval, each of the at least one sector beacon corresponds to a sector among a plurality of sectors, each of the at least one sector beacon includes an indication of sectorized mode transmission and a sector identifier of the corresponding sector, and each of sector beacon intervals includes a sector beacon transmission time and a time interval before a next beacon transmission time with respect to one of the plurality of sectors which are spatially divided; and
transmit, using the transmitter, to the AP, an association request for requesting an association to the AP, the association request being generated by the station based on at least one of the omnidirectional beacon and the at least one sector beacon, and
wherein, during the association in response to the association request, an identifier for a group of the station is allocated by the AP for allowing the station to transmit during a specific sector time duration or during an omnidirectional time duration, and
wherein beacons transmitted by the AP are the omnidirectional beacon and the sector beacon, transmission times of every two consecutive beacons are temporally spaced apart by a beacon interval regardless of type of beacon, and configured beacon intervals are the omni-beacon interval and the sector beacon interval.

* * * * *